United States Patent Office 3,817,734
Patented June 18, 1974

3,817,734
SUSPENDING DEVICE FOR SIDE WALL FENDERS
Donald E. Shamp, Millbury, Ohio, assignor to Libbey-Owens-Ford Company, Toledo, Ohio
Filed Aug. 21, 1972, Ser. No. 282,452
Int. Cl. C03b 18/02
U.S. Cl. 65—99 A                    6 Claims

ABSTRACT OF THE DISCLOSURE

A spring clip device used in conjunction with the "hold-down" of a buoyant carbon side wall fender in the bath area of a float glass apparatus for suspending the fender in operative position prior to the molten metal reaching its normal operating level during start up of the bath.

BACKGROUND OF THE INVENTION

Field of the invention

The present invention relates broadly to the production of float glass, and more particularly to supporting means for the buoyant carbon side wall fenders in the bath area of a float glass apparatus during start up thereof.

Description of the prior art

A conventional form of float glass forming apparatus is illustrated and described in U.S. Pat. No. 3,083,551, granted Apr. 2, 1963. As therein explained, the manufacture of flat glass by the float process involves delivering glass at a controlled rate onto a bath of molten metal and advancing it along the surface of the bath within a "float atmosphere" under physical and thermal conditions which assure (1) that a buoyant body of molten glass will be established on the bath, (2) that the glass in said body will flow laterally to develop on the surface of the bath a buoyant layer of molten glass of stable thickness, and (3) that said buoyant layer will be continuously advanced, in the form of a ribbon, along the bath and sufficiently cooled as it advances to permit it to be taken unharmed out of the bath by mechanical conveying means.

As shown in the aforementioned patent, the molten metal which supports the glass is contained within a refractory lined bath structure comprised of a bottom or floor and opposite side and end walls. In preparing the bath for initial operation, it is necessary to gradually heat the bath structure to operating temperature in order to dry the refractories and allow for thermal expansion of the structure. After the bath structure has reached a suitable temperature, ingots of the metal to be employed therein (generally tin or an alloy thereof) are added to establish the molten bath. Thereafter, the glass is introduced and advanced over the surface of the molten metal to establish a continuous ribbon.

For one reason or another, the ribbon may occasionally tend to veer toward one side or the other as it moves over the molten metal bath. The molten glass and resultant ribbon are generally guided by means of lateral convection currents in the molten metal created by devices referred to in the art as "water fences." These water cooled fences, extending into the bath and selectively spaced along either or both sides of the glass, by modifying the temperature of the bath therein, can control the force of the convection currents, urging the glass toward one side or the other. Improper operation of the fences can cause the lateral steering force of the current to dominate in one direction whereupon the buoyant glass, due to its inability to resist the dominant force, may veer from its desired intermediate path and come into contact with the side walls of the bath chamber. The problem of side wall contact may also be encountered in a situation wherein a malfunction occurs between the rate of flow of molten glass delivered onto the bath and the speed of the drawing rolls, so as to allow an excessive amount to enter the bath thereby causing the glass to drift toward the side walls.

Due to these and other possibilities, it has been proposed that fenders of a suitable material be disposed longitudinally adjacent the lateral sides of the bath chamber, and even that the entire bath chamber be lined with such material. Carbon has been found to be well suited for this purpose since it is inert to the molten metal and the glass, and also is not wetted thereby so that sticking and piling up of the glass in the event of contact are prevented.

In order to hold them in position, the carbon fenders may be affixed to the side walls or, as illustrated and described in U.S. Pat. No. 3,481,729, granted Dec. 2, 1969, inasmuch as carbon has a density less than that of the molten metal (generally tin), they may be maintained in a partially submerged position by means of holding structures. As illustrated in the aforementioned patent, the holding structure, referred to in the prior art as a "hold-down," may be in the form of a counterweighted metallic strap extending through and beyond a recess in a side wall refractory block. The inner end of each strap has a downwardly extending hook which is received in an associated cavity of the carbon fender, with the opposite end being angularly disposed intermediate the outward facing surface of the side block and the outside wall or casing of the bath structure.

It has been found economically and structurally feasible to use a fender somewhat smaller in vertical dimension than that illustrated in the aforementioned Patent No. 3,481,729, giving it a substantially square cross section appearance. Carbon fenders of this nature can be held in their partially submerged position during normal operation, substantially in the same manner as illustrated and described in the prior art. However, with such an arrangement, prior to the molten metal reaching its normal operating level during start up the carbon fenders, due to the absence of support delivered by the molten metal, will not remain in engagement with their associated hold-down, but will rest upon the bottom with the hooks becoming disengaged from the cavities in the fenders.

SUMMARY

According to the present invention, the problem of holding the carbon side wall fenders in operative position during starting and filling of the bath has been entirely eliminated by providing retaining clips having one end affixed to the carbon fender and the opposite end extending over the holddown bracket firmly holding it in place.

It is, therefore, a primary object of the invention to provide a means for holding the side wall fenders in position during starting of the bath.

Another object of the invention is to provide such means in the form of a retaining clip which can be easily disengaged during continued operation of the bath.

Still another object is to provide such a device in which the retaining clip can be affixed to the carbon fender by any conventional temporary fastening means, so that in case of deterioration or damage to the fender, the fender can be removed and replaced by loosening the fastening means and applying downward pressure on the fender, disengaging the hooked end of the hold-down from its associated cavity in the liner.

Other objects and advantages of the invention will become apparent during the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENT

Figure 1:
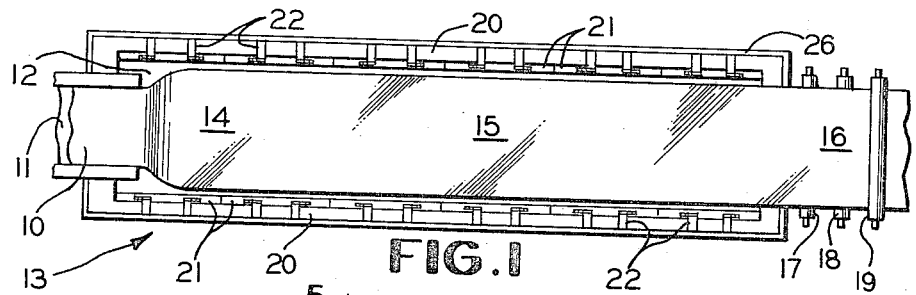
FIG. 1 is a plan view of a conventional float glass forming apparatus with the plenum chamber removed.

Referring now more particularly to the drawings, there is illustrated generally in FIG. 1 a typical float glass machine similar to that disclosed in U.S. Pat. No. 3,083,551. In this apparatus, molten glass 10 supplied from a forehearth (not shown) through a spout 11 falls freely onto a bath of molten metal 12 contained in a chamber 13 and forms a buoyant body of molten glass, indicated at 14.

A buoyant layer of stable thickness 15 develops therefrom, and the ultimate ribbon 16 is formed from this buoyant layer. The temperature in the buoyant layer 15 and ribbon 16 are carefully controlled so that the glass is progressively cooled to the discharge end of the apparatus, by which time the ribbon surface reaches a temperature at which it is sufficiently stiffened to allow its transfer to a lehr on mechanical conveying means without detriment to the surface.

One type of mechanical conveying means that may be employed includes supporting rolls 17 and 18 and an overlying roll 19 in gripping contact with the upper surface of the ribbon, mounted outside the discharge end of the tank. Any or all of the rolls may be driven and cooperate to apply a tractive effort to the ribbon of glass moving towards the outlet end sufficient to advance it along the bath.

Figure 2:
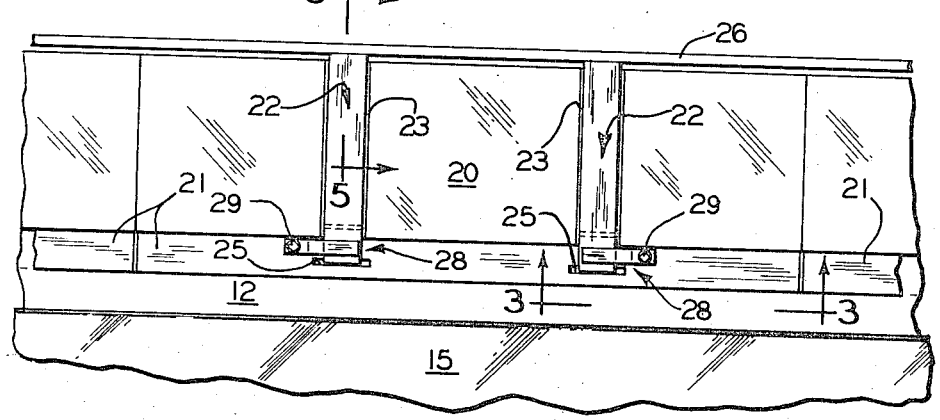
FIG. 2 is a plan view on an enlarged scale of a portion of the apparatus of FIG. 1, showing the fenders and the novel retaining clips of the invention.
Figure 3:
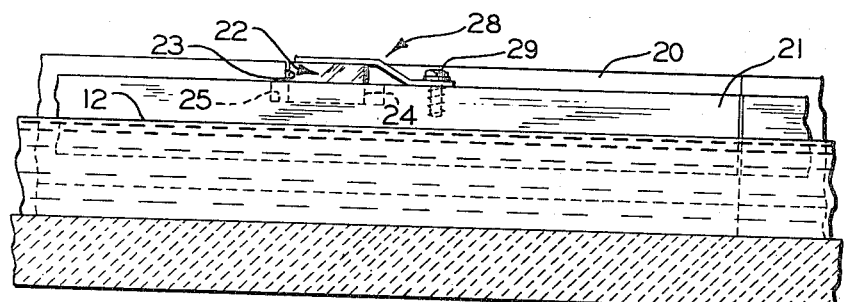
FIG. 3 is a longitudinal vertical section taken substantially along line 3—3 of FIG. 2.

The sides of the bath chamber 13 are defined by refractory walls 20 and, as hereinabove described, there is a possibility of the molten body 14 or buoyant layer 15 accidently coming into contact with these refractory side walls. Thus, a fender 21 comprised of a series of elongated carbon blocks is provided adjacent the opposing side walls 20 and along at least a part if not the entire length of the chamber 13, as outlined in the aforementioned U.S. Pat. No. 3,481,729. The carbon fenders 21, since they are of a lesser density than the molten metal 12, are held in a partially submerged position adjacent the side walls 20 by means of hold-down brackets 22 as shown in FIGS. 2 and 3.

Figures 4, 5:
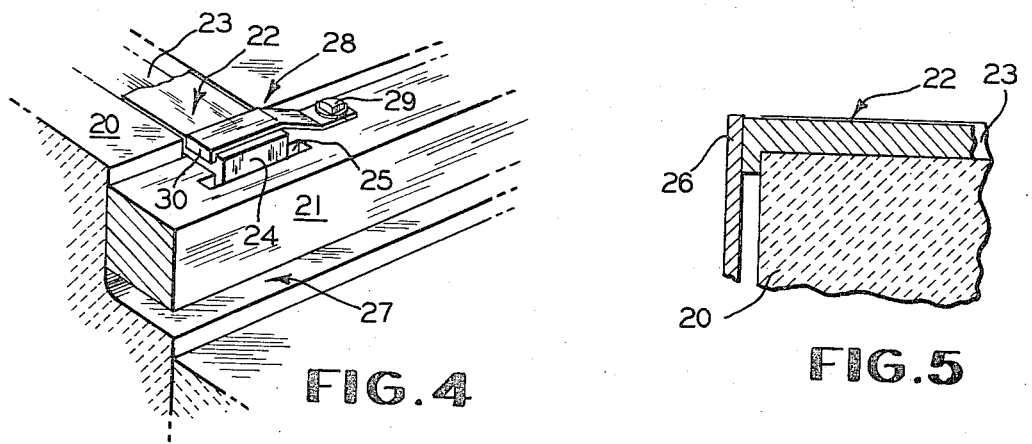
FIG. 4 is a fragmentary perspective view, partially in section, showing the fender and one of its retaining clips before introduction of the molten metal.
FIG. 5 is a fragmentary vertical section taken substantially along line 5—5 of FIG. 2.

In order to facilitate sealing of the sides of the bath structure against the loss of bath atmosphere, the top surfaces of the side walls 20 are provided therein with a plurality of recesses 23 (FIGS. 2 and 4) for receiving the brackets 22. The brackets have their inner ends turned downwardly forming hooks 24, as best shown in FIG. 4, which are received in associated cavities 25 of the fenders 21. The outer ends may be attached to the outer side wall or casing 26 of the chamber 13 in any conventional manner or, as illustrated in FIG. 5, may simply be provided with a turned down end for insertion intermediate the refractory side wall 21 and the outer side wall or casing 26 to restrict lateral movement. As best shown in FIG. 4, although not essential, the refractory side wall blocks 20 may be cut out as indicated at 27 to receive the carbon fenders 21 and still maintain the full potential width of the bath. It is thus possible to add fenders to the bath area of a new or existing float apparatus without detracting from its operative width. As indicated above, the buoyancy of the metal cooperates with the hold-downs to maintain the carbon fenders in position once the bath is in operation, but with the prior art devices there is no support for the fenders before addition of the metal to the bath.

As hereinbefore explained, to prepare it for operation, it is necessary to gradually heat the bath structure to working temperature with metal ingots being added at the proper point in the heat-up process to establish the molten bath. While it is possible to remove the side seal panels (not shown) which close the space between the top of the refractory side wall 21 and the upper portion of the bath chamber of an operating float glass bath and install the fenders through this opening, it is much simpler to install them during construction of the bath structure and before it has been heated. Once the molten metal is in place, it is essential that a protective float atmosphere (generally a mixture of nitrogen and hydrogen) be maintained thereover and oxygen be excluded so as to prevent formation of oxides in the molten metal which might adversely affect the glass. Removal of the side seal panels for installation of the fenders after the bath is heated permits escape of bath atmosphere and ingress of oxygen. The hydrogen in the escaping bath atmosphere burns with an almost invisible flame as it encounters the oxygen, creating the condition known as "sting-out" and making working in the area difficult. Once subjected to the high temperature of the bath, the carbon fenders must also be protected by the float atmosphere since they will rapidly deteriorate if contacted by oxygen at the temperatures encountered. Thus, it will be apparent that initial installation of the fenders before heating of the bath structure and before the molten metal reaches its operating level, is highly desirable.

In accordance with the present invention, means for supporting the carbon fenders within the bath area prior to addition of the metal is effectively attained. Thus, as best shown in FIGS. 2 and 4, each of the carbon fenders 21 has affixed thereto one or more clips or support members 28 to hold it in an elevated position. The clips, comprising a strip of heat resistant metal such as spring steel, engage the holddown brackets 22 so as to support the fenders in a substantially horizontal position. Each clip 28 has one end affixed to the fender 21 by a fastening means, such as a lag screw 29, and the other, or free end, extending up and over the main body of the bracket 22. A lip 30, although not essential, may be formed at the extremity of the clips to hook over the bracket 22 as shown in FIG. 4 to further restrict longitudinal movement of the fender if desired. Thus, clips of this nature when installed accordingly, will hold the fenders in their normal operative position in engagement with the hold-down bracket as if they were floating in the molten metal. The individual fender segments 21 are normally on the order of 3 feet in length, with two of the brackets 22 being employed in holding each segment as illustrated in the drawings. The fender segments are relatively light in weight and it is contemplated that one of the clips 28 may temporarily support each segment until the molten metal reaches operating level. However, it is preferred that one of the clips 28 be associated with each of the hold-down brackets 22.

Should any of the fenders need replacement during continued operation of the bath due to deterioration or damage, this may be accomplished without interrupting operation of the bath by first removing the adjacent side seal panel. The lag screw 29 may then be removed completely, releasing the clip 28, or merely loosened sufficiently to enable the clip to be pivoted inwardly away from the hold-down bracket 22. In either instance, the fender 21 may then be released from its hold-down bracket by depressing into the molten metal 12 so as to disengage the hook 24 from the cavity 25 and thereafter removed from the bath. When installing a replacement fender or additional fenders during continued operation, the clips are not, of course, necessary for support as the molten bath is established. Therefore, the new fender may simply be depressed into the metal, aligning its cavities 25 with the hooks 24 of the hold-downs so as to permit the buoyancy of the metal to induce engagement. If it is found desirable to retain the novel spring clips of the invention when installing the new fenders, the procedure used for removal is then reversed. In such manner, the clips may be mounted after the fenders are in place or, if more convenient, they may be loosely attached to the fenders by the lag screws prior to installation, to be secured once they are in position.

In any event, it is to be understood that the form of the invention herewith shown and described is to be taken as an illustrative embodiment only of the same, and that various changes in the shape, size, number and arrangement of the parts may be resorted to without departing from the spirit of the invention as defined in the following claims.

I claim:

1. In an elongated float glass bath for containing a body of molten metal upon which molten glass is deposited and formed into a continuous ribbon of glass, including a floor, longitudinally extending sidewalls, an elongated independent fender unit to which glass will not stick extending along the inner face of at least a portion of one of said walls and spaced above said floor, and a hold-down bracket extending transversely over and engaging said fender unit and restraining said fender unit against upward movement, the improvement comprising a support member including a strip of heat resistant material extending longitudinally along the top of said fender having one end pivotally affixed to said fender and the other, free end extending up and over said bracket for urging said fender unit upwardly against said bracket.

2. An elongated float glass bath as claimed in claim 1, including a pair of said brackets and said support members positioned at spaced locations along said fender unit.

3. An elongated float glass bath as claimed in claim 1, wherein said bracket includes a horizontal portion extending over said side wall and a hook at the end thereof extending downwardly into a cavity in the top of said fender unit, with said support member extending transversely over said horizontal portion of said bracket.

4. An elongated float glass bath as claimed in claim 1, wherein said support member comprises a spring clip having a first portion extending along the top surface of said fender unit and a second portion extending transversely across the top surface of said bracket, with a lip on said second portion hooked over the edge of said bracket.

5. An elongated float glass bath as claimed in claim 4, including a lag screw extending through said first portion of said clip and threaded into said fender unit for releasably securing said clip to said fender unit.

6. An elongated float glass bath as claimed in claim 1, wherein said bracket includes a horizontal portion extending over said side wall with a hook at the end thereof extending downwardly into a cavity in the top of said fender unit, said support member comprising a spring clip having a first portion extending along the top surface of said fender unit and a second portion extending transversely across the top surface of said bracket, with a lip on said second portion hooked over the edge of said bracket, and including a lag screw extending through said first portion of said clip and threaded into said fender unit for releasably securing said clip to said fender unit.

References Cited

UNITED STATES PATENTS

| 3,627,492 | 12/1971 | Prislan | 65—182 RX |
| 3,264,081 | 8/1966 | Pilkington | 65—182 RX |
| 3,647,408 | 3/1972 | Dickinson | 65—99 A |
| 3,663,196 | 5/1972 | Dickinson et al. | 65—182 R |
| 3,615,333 | 10/1971 | Lawrenson et al. | 65—182 R |

S. LEON BASHORE, Primary Examiner

K. M. SCHOR, Assistant Examiner

U.S. Cl. X.R.

65—182 R